Feb. 12, 1952 C. H. HARMON 2,585,547
ANIMAL CONTROLLED WATERING DEVICE
Filed March 13, 1947 2 SHEETS—SHEET 1

INVENTOR.
Cline Harry Harmon.
BY Bair & Freeman
Att'ys.

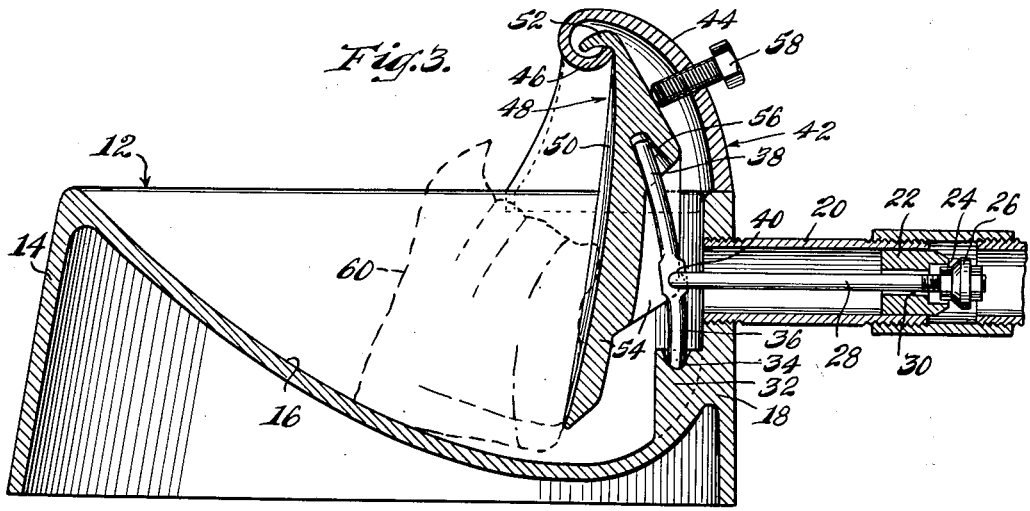
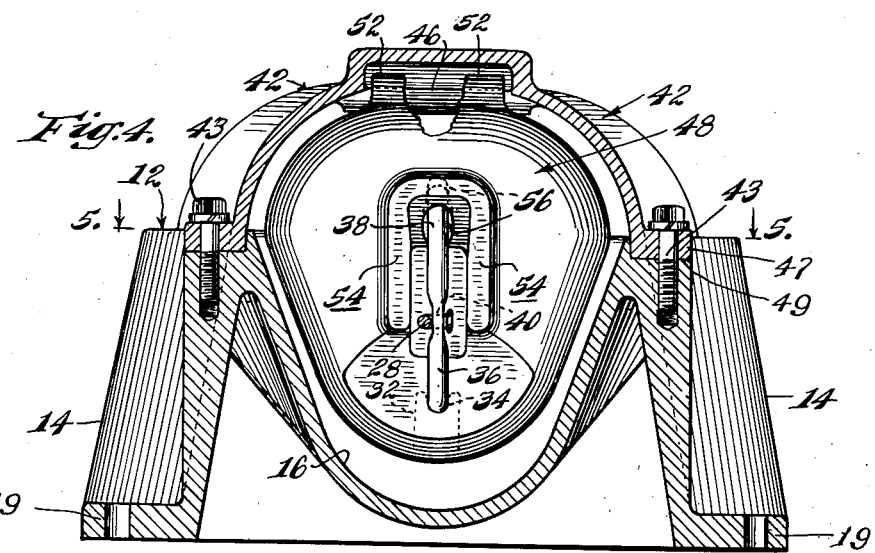
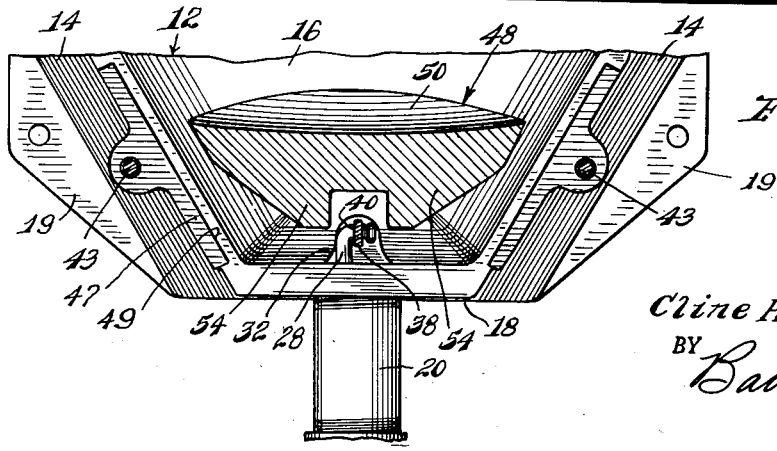

Patented Feb. 12, 1952

2,585,547

UNITED STATES PATENT OFFICE 2,585,547

ANIMAL CONTROLLED WATERING DEVICE

Cline Harry Harmon, Waterloo, Iowa, assignor to Waterloo Foundry Company, Waterloo, Iowa, a copartnership Application March 13, 1947, Serial No. 734,375

5 Claims. (Cl. 119—75)

This invention relates to watering devices for animals.

The device of the present invention is adapted to be connected with a supply of water, either from a pressure system or a gravity system. The apparatus is designed so that the device will be retained full, or have sufficient water therein, by the action of the animals themselves in drinking therefrom.

An object of the invention is the provision of an arrangement of such a watering device in which when the animal seeks to drink water therefrom his natural actions open the water supply, and when water is so supplied and the animal has quenched his thirst, he naturally retracts, permitting the water supply to be shut off.

Specifically, the device includes a watering bowl so shaped that when an animal drinks therefrom and extends his nose into the device in an attempt to drink the last quantity of water therein, his nose contacts a swingable plate which opens a valve when the animal pushes on the plate.

A further object of the invention is the provision of a lever operable by swinging the plate mentioned above, whereby the valve may be opened against high pressure.

Another object of the invention is an arrangement of such a plate, as mentioned above, so arranged and balanced that it tends to swing by gravity to valve closing position. It is therefore unnecessary to employ springs or other means for closing the valve.

A further object is the provision of such a watering device which is self cleaning.

Another object is the provision of a watering device formed of a minimum of parts, and these parts are themselves of simple and rugged construction.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 3 is a longitudinal sectional view taken on line 3—3 of Figure 1;

Figure 4 is a cross sectional view taken on line 4—4 of Figure 2; and

Figure 5 is a partial horizontal sectional view taken on line 5—5 of Figure 4.

Figure 1:
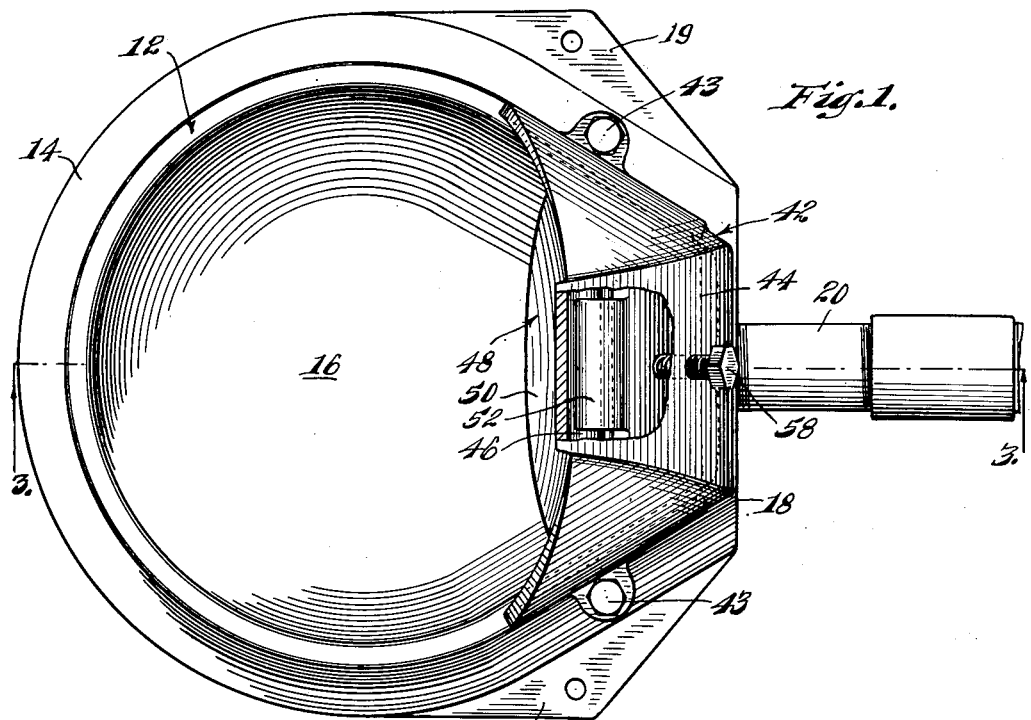
Figure 1 is a plan view of the device of the present invention.
Figure 2:
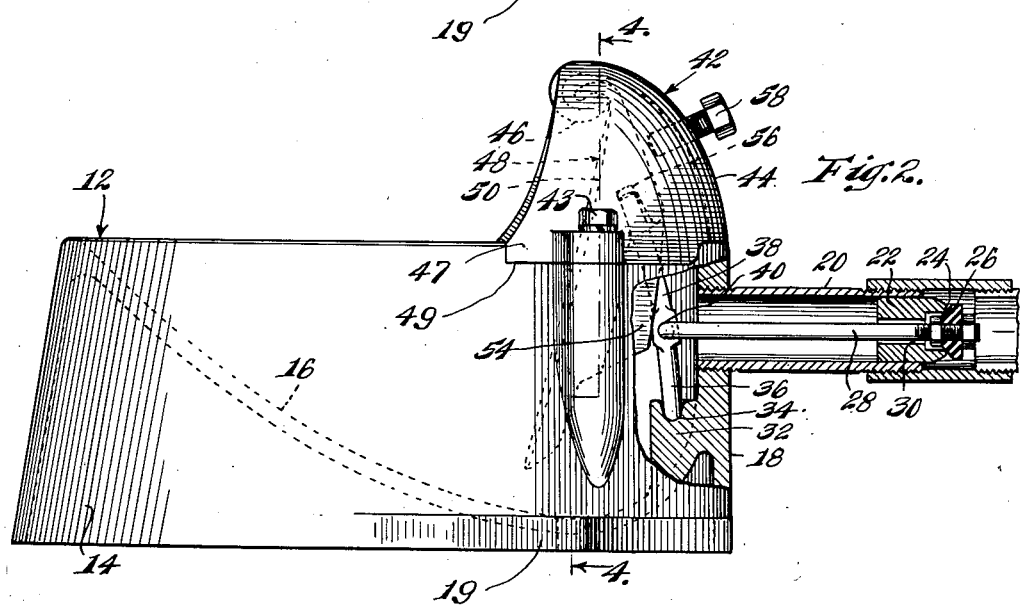
Figure 2 is a side view of the device, with a portion thereof shown broken away.

Referring now in detail to the drawings, the watering device includes a bowl 12, having a depending skirt portion 14 and a dish shaped container 16 for water. The bowl 12 is arranged so that the animal approaches from the left as viewed in Figures 1, 2 and 3. The dish shaped container 16 slopes gradually from the left to the right through substantially the whole length of the bowl 12, and at the right is a substantially vertical wall 18 forming the opposite end of the dish shaped container. The bowl 12 may be supported on a horizontal supporting surface, or on a wall in a slightly elevated position. Lateral ears 19 are formed on the bottom of the skirt portion 14 for securing the bowl on a support.

A feed line 20, which may be attached to a pressure water system or to a gravity fed system, leads into the interior of the bowl through the vertical wall 18 at a point toward the top of the wall 18. The feed line 20 may of course be any desirable pipe with appropriate fittings and connections. Press fitted in the line 20 adjacent the point of communication with the bowl is a plug 22. The plug 22 is provided with a valve seat 24 facing in a direction away from the bowl. A valve closure member 26 is associated with the valve seat 24 and provided with a tapered portion to effectively close the valve seat 24.

The valve closure member 26 is secured on one end of a link or rod 28, the link 28 then extending through a central opening 30 in the plug 22 and extending a short distance into the interior of the bowl 12. The opening 30 is larger than the link 28 to provide a passage for water.

Formed in the interior of the dish shaped container 16 of the bowl is a shelf or projection 32 adjacent the vertical wall 18. The upper surface of the projection 32 is provided with a cavity 34 to form a bearing surface and fulcrum for a vertically extending lever 36. The lever 36 extends upwardly from the cavity 34 across the inner open end of the feed line 20. The upper end 38 of the lever 36 is bowed or bent slightly outwardly in a direction away from the wall 18. The link 28 is pivotally secured to the lever 36 as indicated at 40, this point being intermediate the ends of the lever 36.

A cap or hood 42 is secured to the upper surface of the bowl 12 at the end thereof adjacent the feed line 20. The cap 42 is shell shaped having a rounded end wall 44 and lateral walls extending up and over a portion of the bowl. The cap 42 is removably secured to the bowl 12 by means of bolts 43. The cap 42, it will therefore be noted, has an open side facing toward the left or toward the main body of the bowl 12. The rounded end wall 44 of the cap 42 continues beyond the top marginal edge and is turned down and back, as indicated at 46, to form a hook. The marginal edge of the hook 46 terminates in spaced relation to the under surface of the wall 44. The lower edge of the cap 42 is formed with depending lugs 47 on the sides thereof which fit in corresponding cavities 49 in the bowl 12 for retaining the cap in proper position.

A plate 48 is provided for actuation by the animals desiring to drink. The plate 48 has a broad front surface 50, shown in the present illustration as slightly concave, and a hook 52 at its upper end. The hook 52 is adapted to hook over the cooperating hook 46 and thereby removably support the plate 48. The plate 48 by means of its support by cooperating hooks 46 and 52 is adapted to have swinging movement toward and from the vertical wall 18 on a horizontal axis.

The rear side of the plate 48 facing the vertical wall 18 is provided with a considerable mass of material, as shown at 54, to provide weight for swinging the plate 48 to the left by the action of gravity. The weighted portion is formed with a generally downwardly opening cavity 56 disposed toward the upper end of the plate. A bolt 58 is threaded through the curved wall 44 in the cap 42 and is adapted to be contacted by the plate 48 in the movements of the latter. In assembling the plate 48 in the device, the hook 52 is hooked over the hook 46 before the cap 42 is put in position on the bowl. The cap is then lowered into position, with the upper end of the lever 36 being inserted in the cavity 56, and the cap secured in place. It will be seen that the plate 48 cannot become unhooked by the actions of the animals drinking.

The snout of a hog is shown at 60 in position when the hog drinks from the device. There is usually some water in the device, and when the hog drinks therefrom and lowers the level thereof he extends his snout further down into the bowl, and as the water lowers sufficiently the hog's snout contacts the plate 48 and swings it to the right. This action swings the lever 36 to the right and opens the valve closure member 26, permitting water to flow into the bowl. The bolt 58 is adjusted to the desired point to limit the extent of swinging the plate 48.

In normal operation, when the hog has finished drinking and removes his snout from the bowl, the water in the feed line 20 whether from a pressure system or a gravity fed system, tends to close the valve closure member 26 against the valve seat 24. The plate 48 tends to swing to the left by means of the weighted portion 54, which is an added insurance that the valve closure member will remain closed.

The portion of the lever 36 below the pivot point 40 is shorter than the length 38 above the pivot point providing increased leverage on the lever 36 when the plate 48 is forced against the lever. Also the bearing point in the cavity 56 with the upper end of the lever 36, is disposed considerably above the center of the plate 48. The plate 48 acts as a lever having a short leg above the cavity 56 and a long leg therebelow. When the hog contacts the lower end of the plate 48, added leverage is furnished through the plate 48 and lever 36 to enable the hog to open the valve closure member 26 against the high pressure, if such is necessary.

The upper portion 38 of the lever 36 is curved or bent toward the plate 48 so that when the plate 48 is swung to the right, the force directed against the lever 36 is at more nearly right angles to the lever, furnishing a greater degree of movement of the valve closure member 26.

The device is self cleaning. Any dirt that falls into the device is washed from behind the plate 48 by the incoming water, and such foreign matter is usually consumed by the hog or dragged out of the bowl when he withdraws his head.

It will be noted that the device is made up of a minimum of parts and all of the parts are simple and of rugged construction; the parts are not easily broken and they cannot become disassembled by the action of the animals drinking.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. In a device of the class described, the combination comprising, a watering bowl, a feed line having a control valve communicating with said bowl, a plate pivotally supported in said bowl adjacent said feed line, a lever having one end pivoted in said bowl adjacent said feed line and plate, and a link connected between said lever and control valve, the opposite end of said lever having bearing engagement with said plate, whereby said plate, upon swinging thereof, swings said lever and operates said control valve.

2. In a device of the class described, the combination comprising, a watering bowl, a feed line having a control valve communicating with said bowl, a plate suspended in said bowl and arranged to swing on a horizontal axis, said plate being disposed adjacent said feed line and being weighted to tend to swing away from said feed line, said plate having a generally downwardly opening socket on the side thereof adjacent said feed line, a lever pivoted in said bowl between said plate and said feed line, said lever having a bend such that the swinging end of said lever extends in a direction toward said plate, the swinging end of said lever being fitted in said socket, and a link connecting said lever and said control valve.

3. In a device of the class described, the combination comprising, a watering bowl, a feed line having a control valve communicating with said bowl, a pair of levers pivoted in said bowl adjacent said feed line, said levers having bearing engagement with each other at points spaced from their pivot points, and a link interconnecting one of said levers and said control valve, the other one of said levers having a broad surface directed away from said feed line and toward the body of the interior of the bowl.

4. In a device of the class described, the combination comprising, a watering bowl, a feed line having a control valve communicating with said bowl, a cap removably secured to said bowl adjacent said feed line, said cap covering a relatively small portion of said bowl, the major portion of the bowl being open, hook means on the underside of said cap, and disposed above said bowl, a plate, hook means on said plate adapted to removably hook on and said plate being thereby pivotally supported by the hook means on said cap, said plate when so supported extending into said bowl, and an operative connection between said plate and said control valve, whereby said plate when swung operates said control valve, said operative connection being operative for restraining said plate beyond limited movement and thereby preventing separation of said hook means when said cap is secured to said bowl.

5. In a device of the class described, the combination comprising, a watering bowl, a feed line having a control valve communicating with said bowl, a cap removably secured to said bowl, a plate pivotally supported by said cap and extending downwardly into the bowl, said plate being normally in vertical position and swingable to an alternate position toward horizontal, said plate being mountable on and removable from said cap when in said alternate position and being non-removable when in vertical position, said plate being disposed adjacent said feed line and having limited swinging movement toward said feed line, said plate having a generally downwardly opening socket, a lever pivoted in said bowl and having its swinging end disposed in said socket, and a link interconnecting said lever and said control valve, said lever and control valve being effective for restraining said plate beyond said limited movement toward said alternate position.

CLINE HARRY HARMON.

REFERENCES CITED

The following references are of record in the file of this patent:

UNITED STATES PATENTS

| Number | Name | Date |
|---|---|---|
| 443,228 | Rose | Dec. 23, 1890 |
| 561,453 | Thayer | June 2, 1896 |
| 1,402,653 | Rassmann | Jan. 3, 1922 |
| 2,067,112 | Ahlman | Jan. 5, 1937 |

FOREIGN PATENTS

| Number | Country | Date |
|---|---|---|
| 327,035 | Great Britain | Mar. 27, 1930 |
| 432,139 | Great Britain | July 22, 1935 |